UNITED STATES PATENT OFFICE.

PAUL R. HERSMAN, OF MILWAUKEE, WISCONSIN, ASSIGNOR, BY MESNE ASSIGNMENTS, TO WILLIAM F. JOBBINS, INCORPORATED, OF AURORA, ILLINOIS, A CORPORATION OF ILLINOIS.

PROCESS OF TREATING ALUMINUM SKIMMINGS, SCREENINGS, SLAGS, OR ANALOGOUS MATERIALS.

1,176,292. Specification of Letters Patent. Patented Mar. 21, 1916.

No Drawing. Application filed November 14, 1912. Serial No. 731,346.

*To all whom it may concern:*

Be it known that I, PAUL R. HERSMAN, a subject of the Emperor of Austria-Hungary, residing at Milwaukee, in the county of Milwaukee and State of Wisconsin, have invented new and useful Improvements in Processes of Treating Aluminum Skimmings, Screenings, Slags, or Analogous Materials, of which the following is a full, clear, concise, and exact description.

This invention relates to a process of treating aluminum skimmings, screenings, slags or analogous materials for the purpose of producing certain valuable and useful products.

In carrying out my invention I prefer the following procedure: The skimmings are first separated by suitable means from the larger pieces of metal occurring with them. The residual skimmings consisting of aluminum, aluminum alloys and carbid, nitrid, oxid, carbonate and other compounds of aluminum, small quantities of iron and copper and their compounds, together with other compounds, are thoroughly washed with water, and the water separated from the undissolved portion of the skimmings by sedimentation, centrifuging or other suitable means. The solid portion is treated with a small quantity of hot dilute (approximately $3\frac{1}{2}\%$) sulfuric acid for the purpose of removing the bulk of the iron without dissolving more than minimal quantities of aluminum and the solution thus formed is separated by suitable means from the residual solids. These solids are then treated with an excess of strong sulfuric acid and the excess of acid subsequently neutralized by the addition of an excess of washed skimmings, partially purified from iron. From the strong aluminum sulfate liquor thus resulting the dissolved copper may be separated by precipitation methods, as for instance by addition of an excess of aluminum or other metals of higher electrolytic solution tension than copper, preferably aluminum dust separated from the original skimmings, partially purified from iron and the copper or its compounds thus precipitated may be utilized as such, or may be transformed into salts of copper by well known methods. The small amount of iron in the solution may be separated by well known precipitation methods. The purified sulfate of aluminum liquor is then evaporated to such density that upon cooling it crystallizes to form aluminum sulfate.

It is of course understood that various changes may be made in the procedure here discribed without departing from the spirit of the invention as set forth in the appended claims, as, for example, by making the process of treating with sulfuric acid continuous, and in many other ways that will suggest themselves to those skilled in the art.

Having thus described my invention what I claim as new and desire to secure by Letters Patent is—

1. The herein described process of treating aluminum skimmings, screenings, slags or analogous materials for the production of aluminum sulfate, which consists in treating with dilute sulfuric acid to remove the bulk of the iron contained in the material and subsequently dissolving the solid residue in excess of strong sulfuric acid.

2. The herein described process of treating aluminum skimmings, screenings, slags and analogous materials for the production of aluminum sulfate, which consists in treating the material with dilute acid to remove iron, then dissolving the solid residue in excess of strong sulfuric acid and neutralizing the excess of acid by means of skimmings partially purified from iron.

3. The herein described process of treating aluminum skimmings, screenings, slags and analogous materials for the production of aluminum sulfate, which consists in treating the material with dilute sulfuric acid to remove the bulk of the iron and then dissolving the solid residue in excess of strong sulfuric acid, neutralizing the excess of acid and precipitating copper by the addition of aluminum containing material.

4. The herein described process of treating aluminum skimmings, screenings, slags or analogous materials for the production of aluminum sulfate which consists in first washing the skimmings, separating the water and dissolved salts, then treating with diluted sulfuric acid to remove the bulk of the iron, subsequently dissolving the solid residue in excess of strong sulfuric acid and neutralizing the excess of acid by an excess of skimmings partially purified from iron.

5. The herein described process of treating aluminum skimmings, screenings, slags or analogous materials for the production of aluminum sulfate which consists in first washing the skimmings, separating the water and dissolved salts, then treating with diluted sulfuric acid to remove the bulk of the iron, subsequently dissolving the solid residue in strong sulfuric acid, neutralizing the excess of acid by an excess of skimmings partially purified from iron, then purifying the resulting solution from copper by precipitation methods and then concentrating and crystallizing to form aluminum sulfate.

6. The herein described method of treating aluminum skimmings, screenings, slags or analogous materials for the production of aluminum sulfate, which consists in treating the skimmings with sulfuric acid of sufficient strength to dissolve the bulk of the iron without dissolving more than minimal quantities of aluminum, subsequently treating with excess of strong sulfuric acid, then neutralizing the excess of sulfuric acid with excess of skimmings partially purified from iron, and then evaporating and crystallizing the thus formed aluminum sulfate liquor to produce aluminum sulfate in solid form.

7. The method of treating aluminum skimmings, screenings, slags, or analogous materials which consists in washing the skimmings, treating the washed skimmings with excess of acid, then neutralizing the excess of acid with excess of skimmings, and then treating the thus formed solution with metallic aluminum to precipitate copper.

8. The method of treating aluminum skimmings, screenings, slags or analogous materials, which consists in washing the skimmings, treating the washed skimmings with excess of acid, then neutralizing the excess of acid with excess of skimmings, and then treating the thus formed solution with a metal or metals of higher electrolytic solution tension than copper to precipitate the copper.

9. The method of treating aluminum skimmings, screenings, slags or analogous materials, which consists in washing the skimmings, treating the washed skimmings with excess of acid, then neutralizing the excess of acid with excess of skimmings, and treating the thus formed solution with reagents for the precipitation of copper or its compounds.

10. The method of treating aluminum skimmings, screenings, slags or analogous materials to produce aluminum salts and copper, which consists in washing the skimmings, treating the washed skimmings with excess of acid, then neutralizing the excess of acid with excess of skimmings, treating the thus formed solution with a metal or metals of higher electrolytic solution tension than copper to precipitate the copper, and evaporating and crystallizing the aluminum sulfate solution to produce aluminum sulfate in solid form.

In witness whereof, I have hereunto subscribed my name in the presence of two witnesses.

Dr. PAUL R. HERSMAN.

Witnesses:
James W. Laurie,
Jno. R. Mac Gregor.